United States Patent
Yokoyama

(10) Patent No.: US 7,783,707 B2
(45) Date of Patent: Aug. 24, 2010

(54) COMMUNICATION APPARATUS AND METHOD FOR PROVIDING BROADCAST COMMUNICATION USING ELECTRONIC MAIL

(75) Inventor: Atsushi Yokoyama, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1219 days.

(21) Appl. No.: 10/869,676

(22) Filed: Jun. 16, 2004

(65) Prior Publication Data

US 2005/0004991 A1 Jan. 6, 2005

(30) Foreign Application Priority Data

Jul. 2, 2003 (JP) .............................. 2003-189985

(51) Int. Cl.
G06F 15/16 (2006.01)
(52) U.S. Cl. .................... 709/206; 709/221; 709/224
(58) Field of Classification Search ................. 709/206, 709/221, 224
See application file for complete search history.

(56) References Cited

U.S. PATENT DOCUMENTS

| 6,157,706 | A | * | 12/2000 | Rachelson | ............. | 379/100.08 |
| 6,687,742 | B1 | | 2/2004 | Iwazaki | | |
| 2002/0019848 | A1 | | 2/2002 | Sugawara | | |
| 2002/0075521 | A1 | * | 6/2002 | Oobayashi | .................. | 358/402 |
| 2002/0080415 | A1 | | 6/2002 | Akimoto | | |
| 2003/0020962 | A1 | * | 1/2003 | Tanimoto | .................... | 358/402 |
| 2003/0103492 | A1 | | 6/2003 | Tanimoto | | |
| 2003/0135561 | A1 | * | 7/2003 | Bodin et al. | ................. | 709/206 |
| 2004/0109437 | A1 | * | 6/2004 | Tanimoto | .................... | 370/352 |
| 2004/0218226 | A1 | * | 11/2004 | Antognini et al. | ........... | 358/402 |

FOREIGN PATENT DOCUMENTS

| EP | 1091556 A2 | 4/2001 |
| JP | 2000-196799 | 7/2000 |
| JP | 2000-347954 | 12/2000 |
| JP | 2001-36663 | 2/2001 |
| JP | 2001-160879 | 6/2001 |
| JP | 2001-313778 | 11/2001 |
| JP | 2002-158826 | 5/2002 |
| JP | 2002-244967 | 8/2002 |
| JP | 2003099362 | 4/2003 |

OTHER PUBLICATIONS

August 21, 2008 official action in connection with a counterpart European patent application No. 04 253 777.9.
Aug. 21, 2007 Japanese official action in connection with corresponding Japanese application No. 2003-189985.

* cited by examiner

Primary Examiner—Larry Donaghue
Assistant Examiner—Nicholas Taylor
(74) Attorney, Agent, or Firm—Cooper & Dunham LLP

(57) ABSTRACT

A communication terminal for providing broadcast communication using electronic mail via a network. The communication terminal includes a storing unit configured to store an entry including a mail address and a function mode corresponding to the mail address in an electronic directory, a determining unit configured to determine, based on the entry in the electronic directory, a function mode of a receiver communication terminal, and a transmitting unit configured to transmit image information in a form of broadcast mail to the receiver communication terminal when the determined function mode is a first mode, and to transmit image information in a form of individual mail to the receiver communication terminal when the determined function mode is a second mode.

17 Claims, 9 Drawing Sheets

FIG.3

| MAIL ADDRESS | FUNCTION MODE | CAPABILITY INFORMATION |
|---|---|---|
| 100a1 | 100b1 | 100c1 |
| ⋮ | ⋮ | ⋮ |
| ⋮ | ⋮ | ⋮ |
| ⋮ | ⋮ | ⋮ |
| 100an | 100bn | 100cn |

```
Date: 03 Dec 2002 20:12:57 +0900
X-Mailer: ICFAX Version 1.0
Mime-Version: 1.0
Content-Type: multipart/report; report-type=disposition-notification;
boundary="--ICFAX_63582D8022--"
To: ifax@a.co.jp
Message-ID: <2002120320125785.ICFAX-X59C2E@co.jp>
From: ifax@c.co.jp
```
} HEADER PART

```
----ICFAX_63582D8022----
Content-Type: text/plain

This is a Return Receipt for the mail that you sent to "ifax@c.co.jp"
```
} MAIN TEXT PART

```
----ICFAX_63582D8022----
Content-Type: message/disopsition-notification

Final-Recipient: rfc822;ifax@c.co.jp
Original-Message-ID: <200212032017.IFJ94544.NETIJJ@a.co.jp>
Dispositioin: automatic-action/MDN-sent-automatically; dispatched
Media-Accept-Features: (&(image-file-structure=TIFF-minimal)
        (MRC-mode=0)
        (color=Binary)
        (image-coding=[MH,MR,MMR])
        (| (&(dpi=204)(dpi-xyratio=[204/97,204/196])
          (&(dpi=200)(dpi-xyratio=[200/100,1])))
        (size-x<=2160/254)
        (paper-size=[A4,letter])
        (ua-media=stationery))
```
} CAPABILITY INFORMATION

```
----ICFAX_63582D8022----
```

COMMUNICATION APPARATUS AND METHOD FOR PROVIDING BROADCAST COMMUNICATION USING ELECTRONIC MAIL

BACKGROUND

1. Technical Field

This disclosure relates to a communication terminal, a method, a program and a recording medium and more particularly to communication control technology for a facsimile that communicates image information in electronic mail data format via a network through which plural communication terminals intercommunicate with an Internet protocol.

2. Description of the Related Art

In recent years and continuing, there is a growing demand for multifunctional apparatuses, being combinations of, for example, a facsimile, a copier, and/or a printer, which enable effective use of a network. Furthermore, in addition to electronic documents which are becoming more commonly used in the office, a facsimile communication system, which uses facsimiles for transmitting image information by attaching the image information to electronic mail in compliance with a MIME format, is becoming widely used for communicating with, for example, clients outside the office.

As for ITU-T recommendations regarding communication standards for facsimile transmission via the Internet, there is, for example, Recommendation T.38 (Real-time type) which is a facsimile transmission procedure for transmitting image information by intercommunication of communication terminals directly connected to the Internet, and Recommendation T.37 (Store and Forward type) which is a facsimile transmission procedure for transmitting image information by first storing the image information in a mail server device and intercommunicating the mail server devices with, for example, SMTP (Simple Mail Transfer Protocol).

As for other recommendations providing facsimile communications functions complying with the ITU-T Recommendation T.37, there is, for example, a "Simple Mode" which has neither a function of confirming the functionality of a receiving destination communication terminal when transmitting a document nor a function of sending a mail confirming receipt of the document via the Internet, and a "Full Mode" which has both the function of confirming the functionality of a receiving destination communication terminal when transmitting a document and the function of sending the mail confirming receipt of the document via the Internet.

Furthermore, other technical standards and specifications regarding, for example, communication protocols (e.g. TCP/IP, SMTP, POP), data formats and data structures of electronic mail are provided in the RFC (Request For Comments) issued by IETF (Internet Engineering Task Force).

The Recommendation T.37 and the RFC 2305 (Simple Mode) or RFC 2532 (Full Mode) are both applied with a common electronic mail data format, to thereby allow a communication terminal complying with Recommendation T.37 to intercommunicate information with a communication terminal or workstation device that has installed a software complying with RFC 2305 or RFC 2532.

However, with the Recommendation T.37 and the RFC 2305, image information that is to be transmitted is bound to fixed conditions (number of horizontal pixels: 1728 pixels; resolution: 200×100 dpi or 200×200 dpi; compression: MH); and is required to be attached to an electronic mail message and use a designated mail address for transmission and receipt of the image information. This prevents image information with higher quality from being transmitted and received.

In Japanese Laid-Open Patent Application No.2000-347954, a sender communication terminal compresses read-out image data according to a fixed parameter, attaches the image information to an electronic mail message, and transmits the image information along with information indicating a self-controlling method, and identification information for requesting information of the function of a receiver communication terminal. In a case where the receiver communication terminal has installed a general type of electronic mail software, the attached image information is output in a form complying with the predetermined conditions.

In a case where the receiver communication terminal has installed a control method which is the same as that of the sender communication terminal, the image information is not required to be output by attachment to the electronic mail in compliance with predetermined conditions. Instead, the receiver communication terminal responds to the sender communication terminal by sending a message describing information on its own control method and its own capabilities.

The sender communication terminal generates image information including data regarding size, resolution, and/or compression of the image in accordance with the capabilities of the receiver communication terminal, attaches the image information to an electronic mail message, and re-transmits the mail, thereby enabling transmission of image information with higher quality.

Accordingly, the example proposed in Japanese Laid-Open Patent Application No.2000-347954 is able to have affinity with a receiver communication terminal that has installed a general type of electronic mail software, and also transmit images in accordance with the capabilities (image information conditions) of a receiver communication terminal when the receiver communication terminal has capabilities the same as those of the sender communication terminal.

In Japanese Laid-Open Patent Application No.2001-313778, a store and forward type network facsimile (technology) is able to transmit its capability information to a receiver communication terminal by writing capability information into a preamble part and an epilogue part of an electronic mail message defined in a multi-part form of MIME without affecting the main text of the electronic mail. Furthermore, when the message of the electronic mail is received, the sender communication terminal stores capability information relative to the mail address of the receiver communication terminal so that image information, next time, can be transmitted in accordance with the receiver communication terminal. Accordingly, image information can be transmitted with higher quality.

Accordingly, the example proposed in Japanese Laid-Open Patent Application No.2001-313778 is a store and forward type technology which is able to transmit capability information without affecting the main text of the electronic mail message, and utilize the capability information.

However, the example proposed in Japanese Laid-Open Patent Application No.2000-347954 requires an increased workload (process load) for generating compressed data, and burdens the mail server since the example employs a process of generating image information including data regarding size, resolution, and/or compression of the image in accordance with the capabilities of the receiver communication terminal, attaching the image information to an electronic mail message, and re-transmitting the electronic mail when the receiver communication terminal has capabilities the same as those of the sender communication terminal, while still achieving affinity with a receiver communication terminal that has installed a general type of electronic mail software. In addition, the re-transmission of the electronic mail increases undesired communications traffic, burdens the network, and adversely affects other communications.

Furthermore, since the example proposed in Japanese Laid-Open Patent Application No.2001-313778 conducts an update on the conditions (capability) for image information transmission by employing a full mode provided with functions including capability confirmation and acknowledgement of receipt, the example has a problem where broadcast transmission, against the will of the user, cannot be conducted due to the update of capability of the receiver communication terminal. In addition, the example has a problem of requiring that all image information files attached to the electronic mail must be the same for conducting broadcast transmission to a plurality of receiver communication terminals.

SUMMARY

In an aspect of this disclosure, a communication terminal provides broadcast communication using electronic mail via a network, the communication terminal including a storing unit configured to store an entry including a mail address and a function mode corresponding to the mail address in an electronic directory, a determining unit configured to determine, based on the entry in the electronic directory, a function mode of a receiver communication terminal, and a transmitting unit configured to transmit image information in a form of broadcast mail to the receiver communication terminal when the determined function mode is a first mode, and to transmit image information in a form of individual mail to the receiver communication terminal when the determined function mode is a second mode.

In the communication terminal according to an embodiment of the present invention, the communication terminal may be a communication terminal having a facsimile function complying with ITU-T Recommendation T.37 for full mode, wherein the first mode may be a simple mode, wherein the second mode may be the full mode.

In the communication terminal according to an embodiment of the present invention, the entry may be input from a control panel of the communication terminal.

In the communication terminal according to an embodiment of the present invention, the entry may be input from a Web browser of a workstation via the network.

In the communication terminal according to an embodiment of the present invention, when the communication terminal receives a receipt confirmation mail from the receiver communication terminal, the communication terminal may obtain capability information of the receiver communication terminal, may analyze the receipt confirmation mail, and may update the electronic directory.

In the communication terminal according to an embodiment of the present invention, the communication terminal may not update the electronic directory when the function mode of the receiver communication terminal is set as the first mode.

Furthermore, the present invention provides communication terminal means for providing broadcast communication using electronic mail via a network, the communication terminal means including: storing means for storing an entry including a mail address and a function mode corresponding to the mail address in an electronic directory; determining means for determining, based on the entry in the electronic directory, a function mode of a receiver communication terminal means; and transmitting means for transmitting image information in a form of broadcast mail to the receiver communication terminal means when the determined function mode is a first mode, and transmitting image information in a form of individual mail to the receiver communication terminal means when the determined function mode is a second mode.

In the communication terminal means according to an embodiment of the present invention, the communication terminal means may be a communication terminal means having a facsimile function complying with ITU-T Recommendation T.37 for full mode, wherein the first mode may be a simple mode, wherein the second mode may be the full mode.

In the communication terminal means according to an embodiment of the present invention, the entry may be input from a control panel of the communication terminal means.

In the communication terminal means according to an embodiment of the present invention, the entry may be input from a Web browser of a workstation via the network.

In the communication terminal means according to an embodiment of the present invention, when the communication terminal means receives a receipt confirmation mail from the receiver communication terminal means, the communication terminal means may obtain capability information of the receiver communication terminal means, may analyze the receipt confirmation mail, and may update the electronic directory.

In the communication terminal means according to an embodiment of the present invention, the communication terminal means may not update the electronic directory when the function mode of the receiver communication terminal means is set as the first mode.

Furthermore, the present invention provides a communication method for providing broadcast communication with a communication terminal using electronic mail via a network, the method including the steps of: a) storing an entry including a mail address and a function mode corresponding to the mail address in an electronic directory; b) determining, based on the entry in the electronic directory, a function mode of a receiver communication terminal; and c) transmitting image information in a form of broadcast mail to the receiver communication terminal when the determined function mode is a first mode, and transmitting image information in a form of individual mail to the receiver communication terminal when the determined function mode is a second mode.

In the communication method according to an embodiment of the present invention, the communication terminal may be a communication terminal having a facsimile function complying with ITU-T Recommendation T.37 for full mode, wherein the first mode may be a simple mode, wherein the second mode may be the full mode.

In the communication method according to an embodiment of the present invention, the entry may be input from a control panel of the communication terminal.

In the communication method according to an embodiment of the present invention, the entry may be input from a Web browser of a workstation via the network.

In the communication method according to an embodiment of the present invention, when the communication terminal receives a receipt confirmation mail from the receiver communication terminal, the communication terminal may obtain capability information of the receiver communication terminal, may analyze the receipt confirmation mail, and may update the electronic directory.

In the communication method according to an embodiment of the present invention, the communication terminal may not update the electronic directory when the function mode of the receiver communication terminal is set as the first mode.

Furthermore, the present invention provides a program to be installed or executed by a computer for providing broadcast communication with a communication terminal using electronic mail via a network, the program including: a storing function for storing an entry including a mail address and a function mode corresponding to the mail address in an electronic directory; a determining function for determining, based on the entry in the electronic directory, a function mode of a receiver communication terminal; and a transmitting function for transmitting image information in a form of broadcast mail to the receiver communication terminal when the determined function mode is a first mode, and transmitting image information in a form of individual mail to the receiver communication terminal when the determined function mode is a second mode.

In the program according to an embodiment of the present invention, the communication terminal may be a communication terminal having a facsimile function complying with ITU-T Recommendation T.37 for full mode, wherein the first mode may be a simple mode, wherein the second mode may be the full mode.

In the communication method according to an embodiment of the present invention, the entry may be input from a control panel of the communication terminal.

In the communication method according to an embodiment of the present invention, the entry may be input from a Web browser of a workstation via the network.

In the communication method according to an embodiment of the present invention, when the communication terminal receives a receipt confirmation mail from the receiver communication terminal, the communication terminal may obtain capability information of the receiver communication terminal, may analyze the receipt confirmation mail, and may update the electronic directory.

In the communication method according to an embodiment of the present invention, the communication terminal may not update the electronic directory when the function mode of the receiver communication terminal is set as the first mode.

Furthermore, the present invention provides a computer readable recording medium including the program according to an embodiment of the present invention.

Other aspects and further features of the present invention will become apparent from the following detailed description when read in conjunction with the accompanying drawings.

BRIEF DESCRIPTION OF THE DRAWINGS

FIG. 3 is a table showing an exemplary data structure of an electronic directory according to an embodiment of the present invention;

FIG. 8 is a schematic diagram showing an example of a receipt confirmation mail transmitted from a receiver communication terminal to a sender communication terminal according to an embodiment of the present invention.

DESCRIPTION OF THE PREFERRED EMBODIMENTS

In the following, embodiments of the present invention are described in detail with reference to the accompanying drawings.

Figure 1:
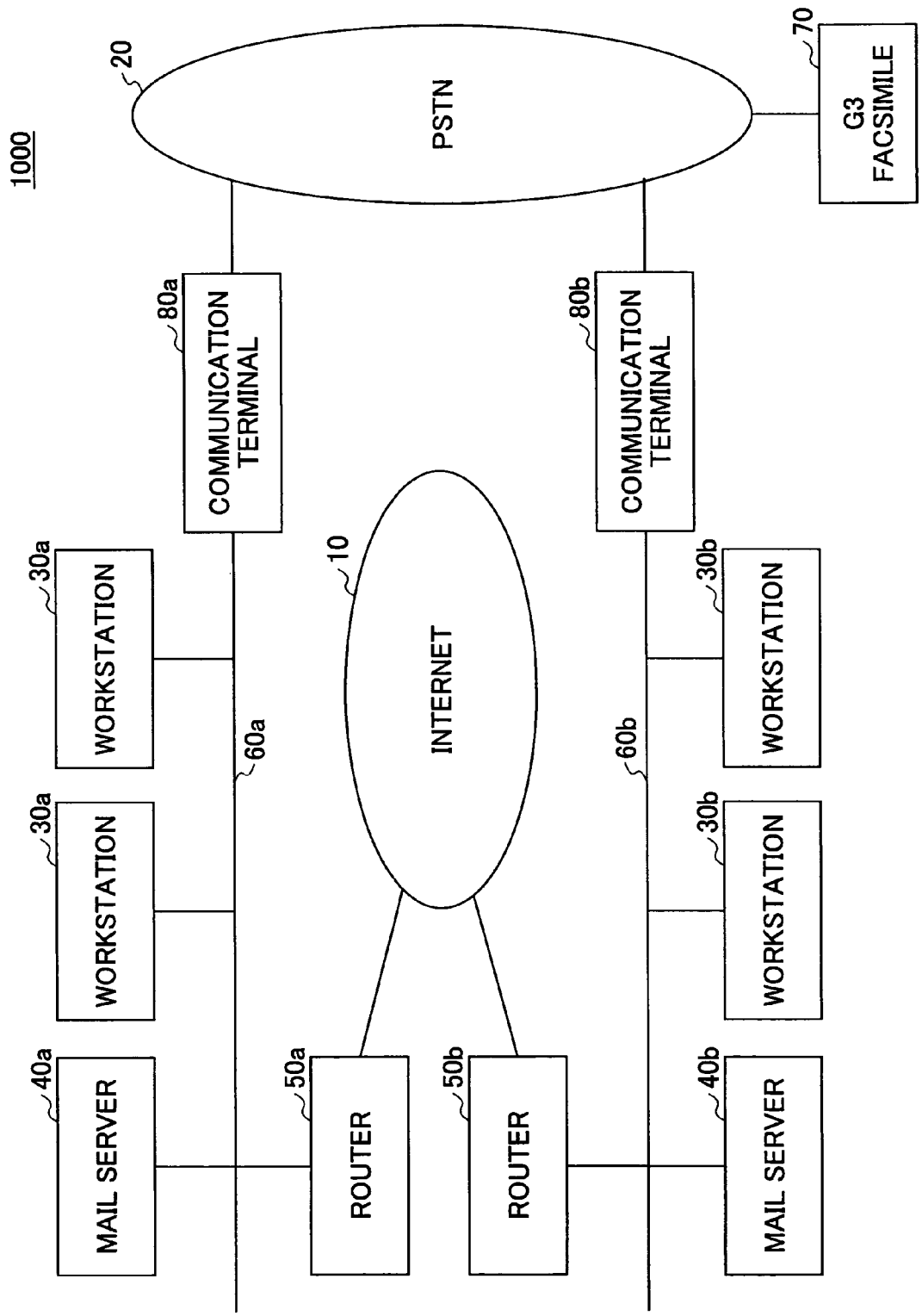
FIG. 1 is a schematic drawing showing the entire structure of a facsimile communication system according to an embodiment of the present invention.

FIG. 1 is a schematic diagram showing the entire structure of a facsimile communication system 1000 according to an embodiment of the present invention. In the facsimile communication system 1000 shown in FIG. 1, a local area network (LAN) system 60 (60a, 60b) is connected to the Internet 10 via a router 50 (50a, 50b), the LAN system 60 is connected to a public switched telephone network (PSTN) 20 via a communication terminal 80 (80a, 80b), and the PSTN 20 is connected to a G3 facsimile apparatus 70.

The LAN system 60 is connected to plural workstations 30 (30a, 30b), mail servers 40 (40a, 40b), routers 50 (50a, 50b), and communication terminals 80 (80a, 80b), to thereby provide a facsimile communication system.

The communication terminals 80 (80a, 80b) employ Internet Protocols (IP), such as for the Internet and an Intranet, in accordance with Recommendation T.37 (store and forward type procedure) for exchanging image information with electronic mail.

Furthermore, the communication terminals 80 (80a, 80b) perform facsimile communication with the G3 facsimile apparatus 70 via the PSTN 20.

The exchange of data performed among the workstations 30 (30a, 30b), the mail servers 40 (40a, 40b), and the communication terminals 80 (80a, 80b) via the LAN system 60, and via the Internet are performed by applying a combination of transfer protocols up to the transport layer referred to as TCP/IP and communication protocols that are situated on layers higher than the transport layer.

In the exchange of electronic mail, a communication protocol referred to as SMTP is applied as the higher layer communication protocol.

In this embodiment, electronic mail is transmitted according to the store and forward type procedure in which electronic mail is first stored in the mail server 40 (40a, 40b) and then transmitted to a receiver destination. In a case where the mail address appended to the electronic mail has a network address that is set for each LAN system 60 (60a, 60b), the electronic mail is directly stored in a corresponding mail server 40 (40a, 40b). In a case where the mail address appended to the electronic mail has no network address that is set for each LAN system 60 (60a, 60b), the electronic mail is first transmitted to the Internet 10 via the routers 50 (50a, 50b), and is then transmitted from the Internet 10 (using a transfer function) to the mail server 40 (40a, 40b) having the network address corresponding to the mail address of the electronic mail.

For example, in a case where electronic mail is transmitted from a user in one LAN 60a to another user in another LAN 60*b*, the electronic mail is first stored in the mail server 40*a*, then transmitted to the Internet 10 via the router 50*a*, and then transmitted and stored in the mail server 40*b* via the router 50*b*.

Meanwhile, workstations 30 (30*a*, 30*b*) and communication terminals 80 (80*a*, 80*b*) periodically query the mail server 40 (40*a*, 40*b*) for acknowledgement of receipt of electronic mail addressed to its own user. When electronic mail addressed to the user is stored in the mail server 40 (40*a*, 40*b*), the workstations 30 (30*a*, 30*b*) and the communication terminals 80 (80*a*, 80*b*) receive the electronic mail from the mail server 40 (40*a*, 40*b*) and notify the user of the receipt.

Here, the workstations 30 (30*a*, 30*b*) and the communication terminals 80 (80*a*, 80*b*) are supplied with a protocol such as POP for querying the mail servers 40 (40*a*, 40*b*) about the receipt of electronic mail addressed to the user.

Figure 2:
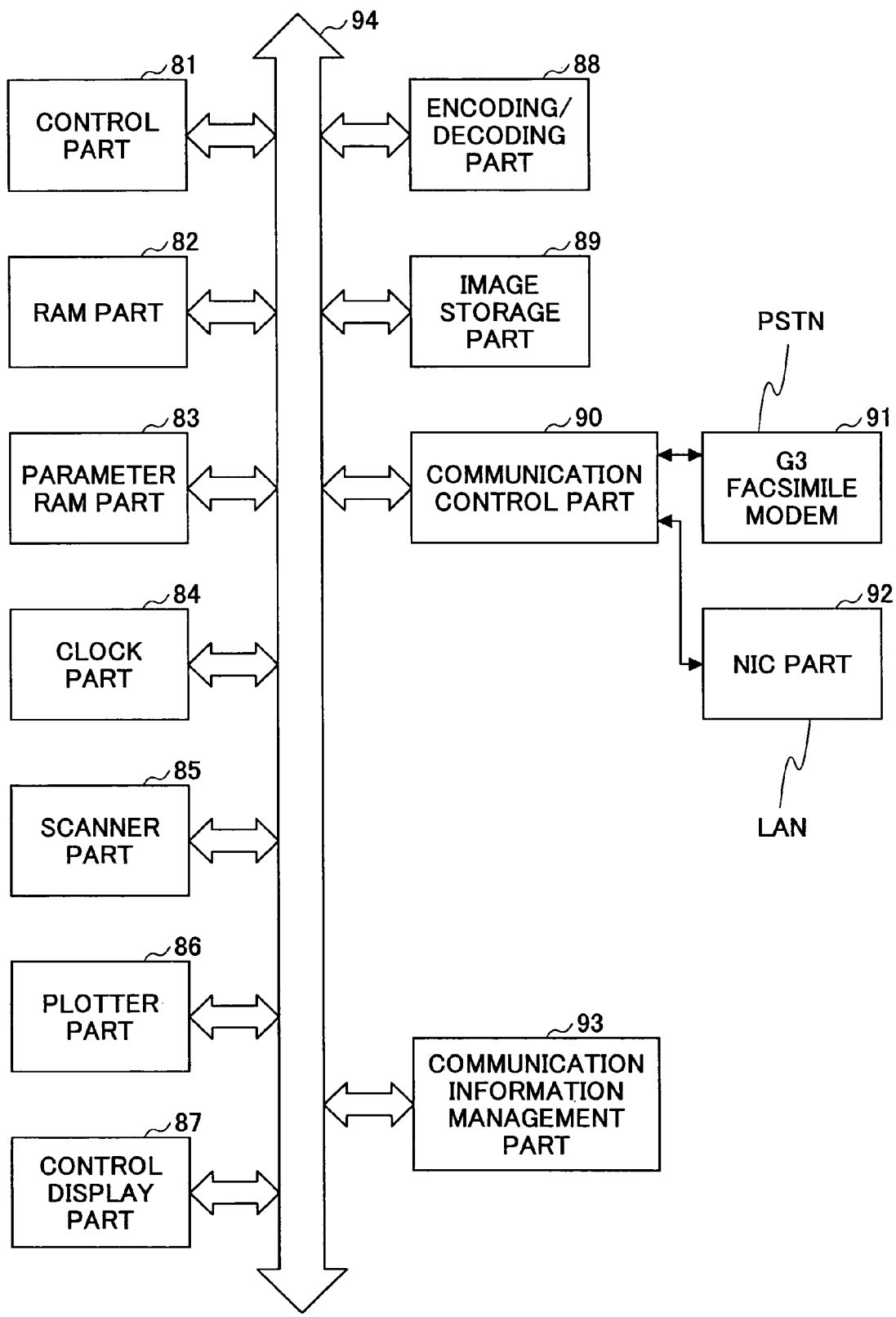
FIG. 2 is a block diagram showing a structure of a communication terminal according to an embodiment of the present invention.

FIG. 2 is a block diagram showing an exemplary structure of a communication terminal according to an embodiment of the present invention. In FIG. 2, the communication terminal 80, having a facsimile communication function complying with Recommendation T.37, includes a control part 81, a RAM part 82, a parameter RAM 83, a clock part 84, a scanner part 85, a plotter part 86, a control display part 87, a encoding/decoding part 88, an image storage part 89, a communication control part 90, a G3 facsimile modem 91, a NIC (Network Interface Card) part 92, and a communication information management part 93.

Furthermore, the control part 81, the RAM part 82, the parameter RAM 83, the clock part 84, the scanner part 85, the plotter part 86, the control display part 87, the encoding/decoding part 88, the image storage part 89, the communication control part 90, the G3 facsimile modem 91, the NIC part 92, and the communication information management part 93 are connected to an internal bus 94, to thereby enable exchange of data via the internal bus 94.

The control part 81 perform various controls and processes, for example, the control of the entire communication terminal 80, the control of the components of the communication terminal 80, the process of the facsimile transmission procedure complying with the Recommendation T.38 procedure, and/or the process of the store and forward type transmission procedure complying with the Recommendation T.37 procedure.

The RAM part 82 holds a control program executed by the control part 81 and various data that are necessary for executing the control program, and provides a work area for the control part 81.

The parameter RAM part 83 stores various information items and management tables of the communication terminal 80, and is backed up by a battery (not shown) so that such parameters are not lost from power shut down due to unexpected reasons or to safety reasons.

The clock part 84 outputs information of the current time.

The scanner part 85 reads out the image of a document with a prescribed resolution.

The plotter part 86 records and outputs an image with a prescribed resolution.

The control display part 87, which is employed for controlling the communication terminal 80, includes a control panel provided with various control keys and a display part for displaying various information items.

The encoding/decoding part 88 encodes (compresses) image information based on, for example, MH, MR, or MMR, and decodes the encoded image information.

The image storage part 89 stores image information which is in a state compressed by the encoding/decoding part 88.

The communication control part 90 is connected to the G3 facsimile modem 91 for connecting the communication terminal 80 to the PSTN 20 based on the G3 facsimile transmission procedure, and to the NIC part 92 for connecting the communication terminal 80 to the LAN 60.

The G3 facsimile modem 91 has a low speed modem function (e.g. V.21 modem) for exchanging signals based on facsimile transmission procedures and a high speed modem function (e.g. V.17 modem, V.34 modem, V.29 modem, V.27 ter modem) for exchanging mainly image information.

By exchanging data with the G3 facsimile modem 91, the communication control part 90 performs facsimile communication (Recommendation T.38) with the G3 facsimile apparatus 70.

The NIC part 92 connects the communication terminal 80 to the Ethernet (Registered Trademark) cable of the LAN 60, so as to perform, for example, application of protocols such as TCP/IP, SMTP/POP, and conversion into MIME. Accordingly, the NIC part 92 provides a function as an interface with the Internet 10, and ensures a function for performing the store and forward type transmission procedure.

The communication information management part 93 serves to save and manage file attributes (e.g. file number, mail address) and other communication related information.

Next, an exemplary structure of an electronic directory stored in the parameter RAM part 83 of the communication terminal 80 is described.

FIG. 3 shows an exemplary data structure of an electronic directory 100. The electronic directory 100, including the items given below, registers the mail address of a receiver communication terminal, the function mode (distinction between the simple mode and the full mode), and capability information.

Mail Address Item 100*an*:

This item stores mail addresses of the receiver communication terminal 80.

Function Mode Item 100*bn*:

This item stores information indicating whether to use a function of responding to an electronic mail inquiring about the capability of the receiver communication terminal and about the acknowledgement (confirmation) of the transmitted mail. Even for a communication terminal complying with the full mode, the function of responding to the inquiries will not be used when the function mode is set to simple mode. On the other hand, when the function mode is set to full mode, an electronic mail is transmitted in response to the inquiry about the acknowledgement of mail.

Function Information Item 100 *cn*:

This item stores capability information (e.g. resolution, image size, compression) when the receiver communication terminal 80 complies with full mode.

Figure 4:
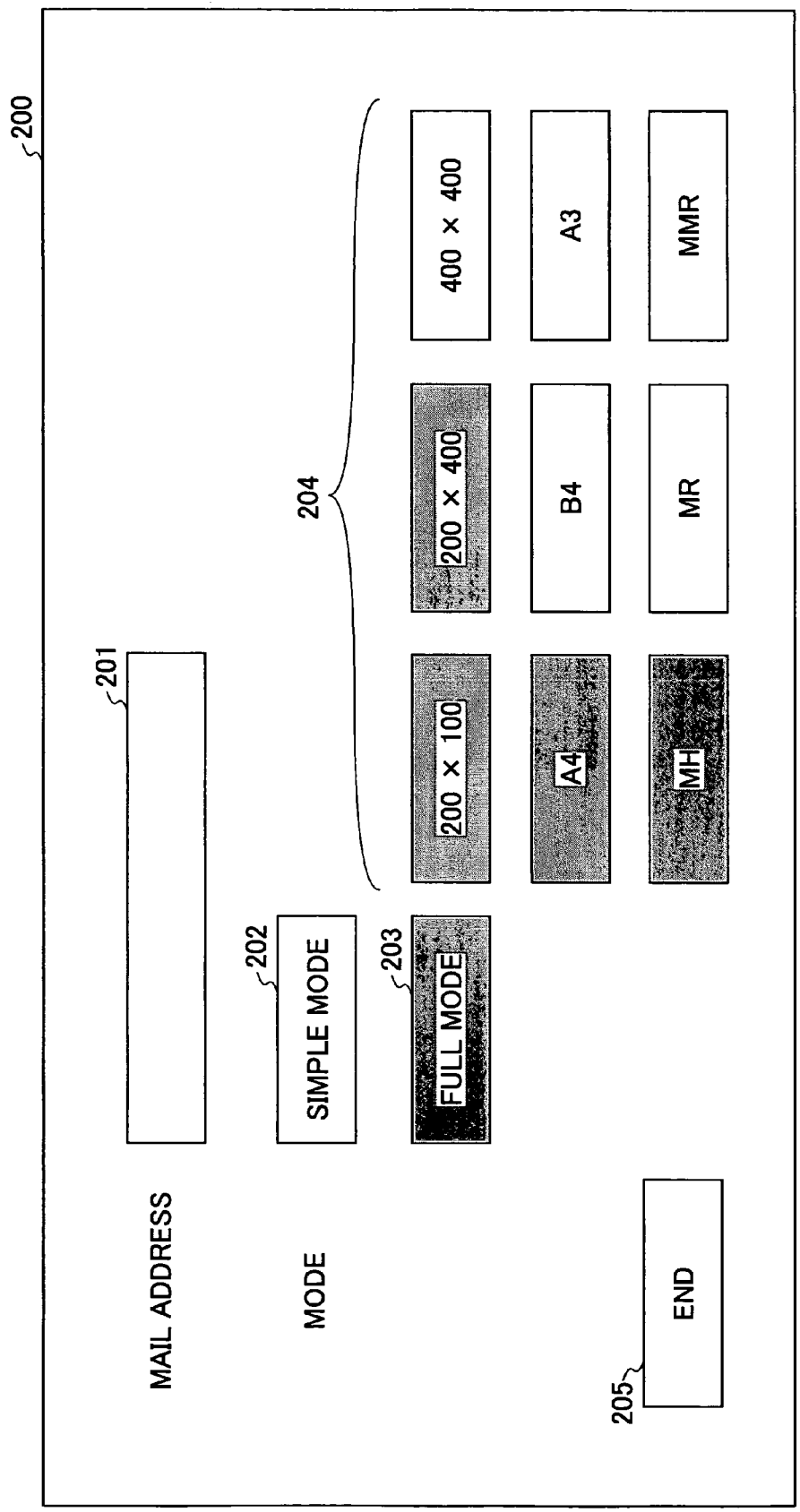
FIG. 4 is a schematic diagram showing an example of a registration screen for registering function mode and capability information of a receiver communication terminal according to an embodiment of the present invention.

Next, FIG. 4 shows an example of a registration screen when registering the function mode and the capability information of the receiver communication terminal 80. In FIG. 4, a registration screen 200 includes a mail address input area 201 for setting the mail address of the receiver communication terminal 80, simple and full mode buttons 202, 203 for setting the function mode, and an end button 205. Furthermore, when the full mode button is pressed, capability buttons 204 for designating corresponding capabilities (e.g. resolution, image size, compression) are displayed.

The registration screen 200 is displayed by depressing a control key on a control panel of a control display part of a sender communication terminal. Alternatively, the registration screen 200 may be activated from a Web browser of the workstation 30 connected to the LAN 60, thereby allowing each of the items set by the registration screen to be set and registered in the electronic directory 100.

Figure 5:
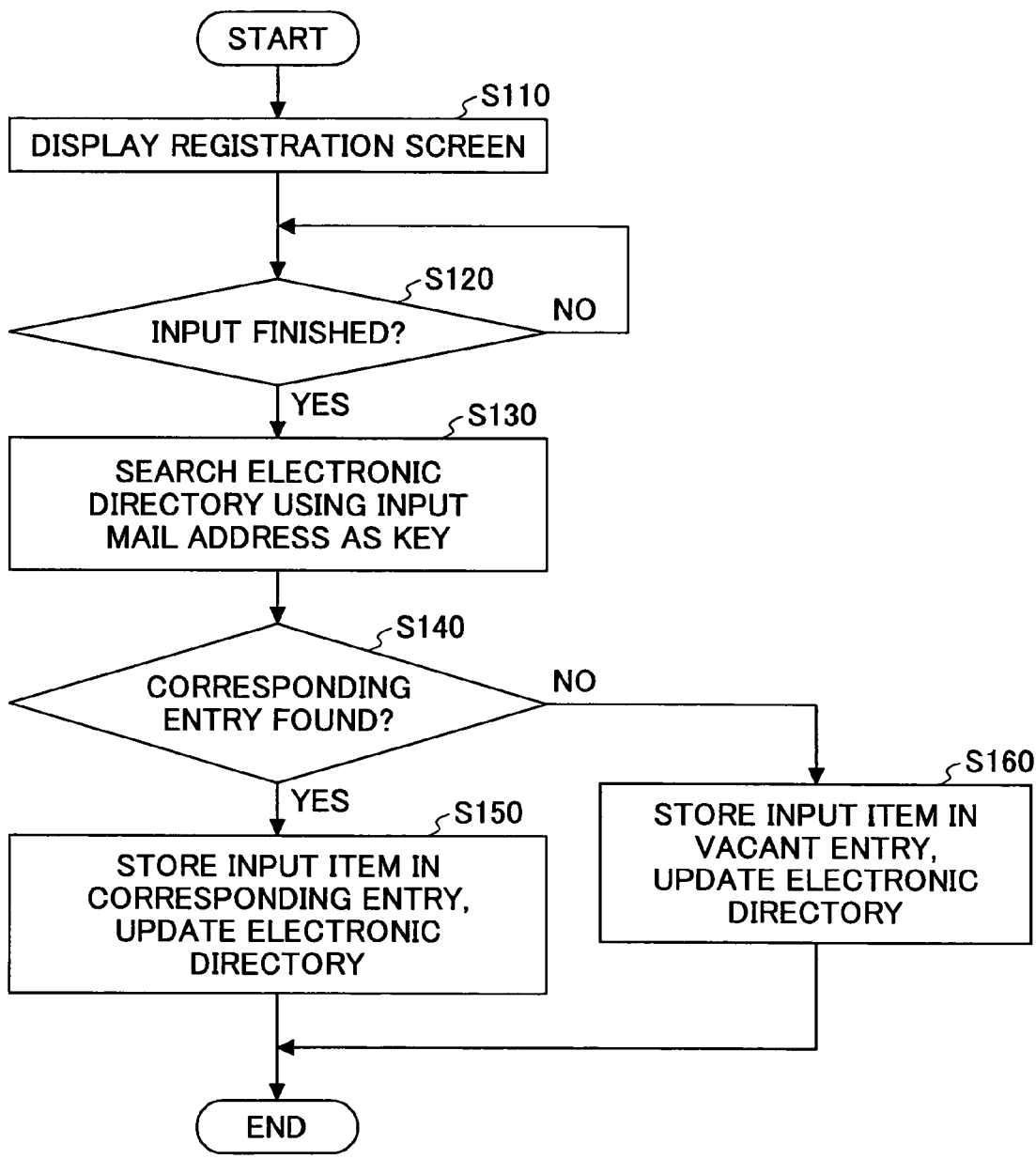
FIG. 5 is a flowchart showing a process for registering a mail address, a function mode, and capability information of a receiver communication terminal by employing a registration screen according to an embodiment of the present invention.

FIG. 5 is a flowchart showing a process of registering the mail address, the function mode, and the capability information of the receiver communication terminal from the registration screen 200 shown in FIG. 4. A case where the registration process is performed by using a control panel of the communication terminal 80 is described below.

When an operator commands registration in the electronic directory with the control panel, the registration screen 200 shown in FIG. 4 is displayed (Step S110). The registration screen 200 remains displayed until the operator inputs the necessary items and depresses the end button 205 (Step S120).

Here, when the full mode button 203 is pressed, the capability buttons 204 designating various capabilities (e.g. resolution, image size, compression) are displayed. When the simple mode button 202 is pressed, the capability buttons 204 are not displayed.

Using the input mail address as a key, a search for a corresponding entry is performed by searching through the electronic directory 100 (Step S130).

When the corresponding entry is found (YES in Step S140), the items input by the operator (e.g. function modes distinguishing the use of either the simple mode or the full mode; and/or capabilities including, for example, resolution, image size, compression when the full mode is selected) are stored in the corresponding entry, and the electronic directory 100 is updated (Step S150). After Step S150, the process is finished.

When no corresponding entry is found (NO in Step S140), the items input by the operator (e.g. function modes distinguishing the use of either the simple mode or the full mode; and/or capabilities including, for example, resolution, image size, compression when the full mode is selected) are stored in a vacant entry in the electronic directory 100, and the electronic directory 100 is updated (Step S160). After Step S160, the process is finished.

In a case of performing the registration process from the workstation 30, a Web browser of the workstation 30 is used to activate the registration screen of the communication terminal 80. Then, the above-described processes of inputting the mail address, the function mode, and the capabilities of the receiver communication terminal 80, searching through the electronic directory 100, storing the input items, and updating the electronic directory 100 are executed.

Figure 6:
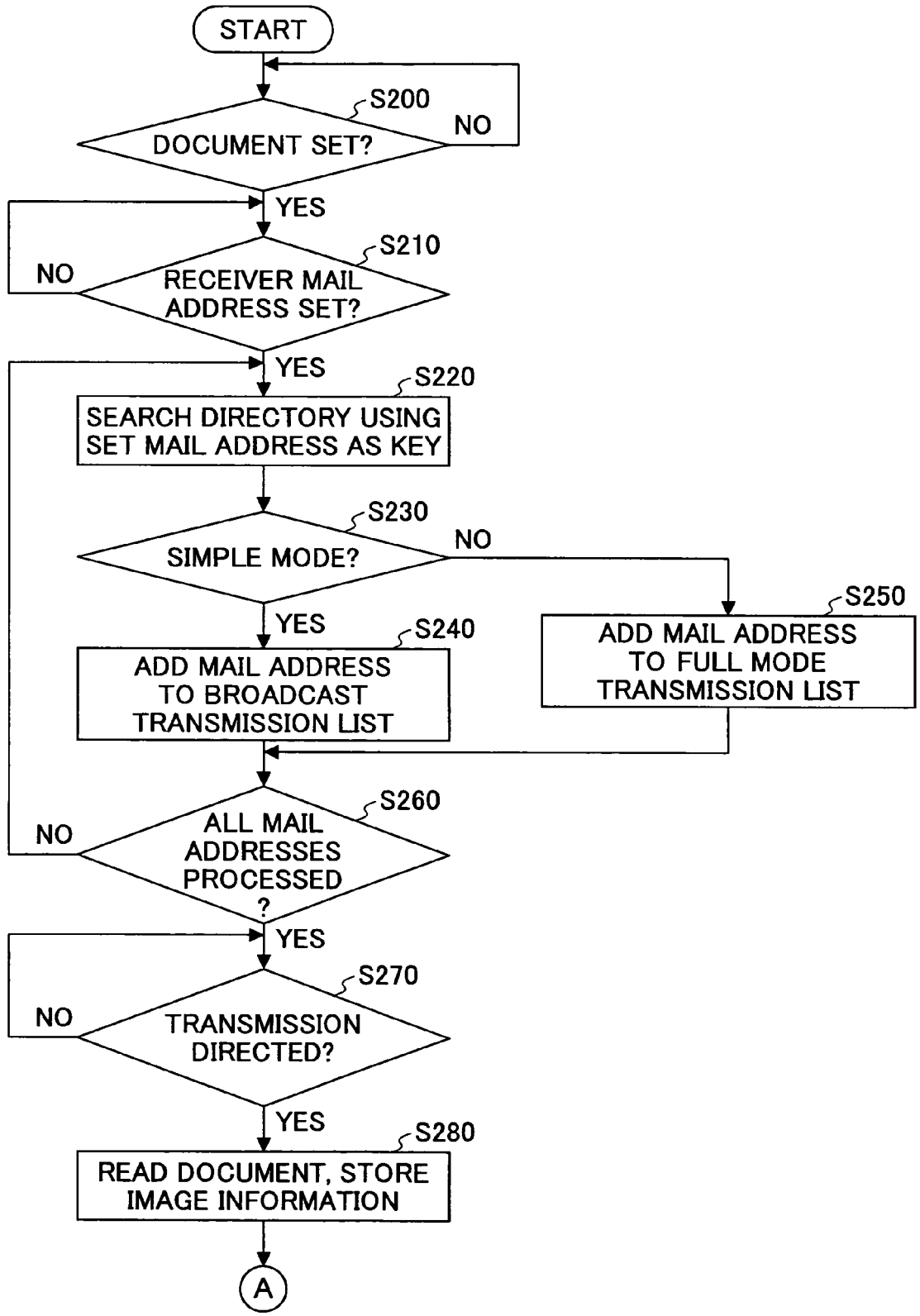
FIG. 6 is a flowchart showing a process (part 1) of performing broadcast transmission using electronic mail according to an embodiment of the present invention.
Figure 7:
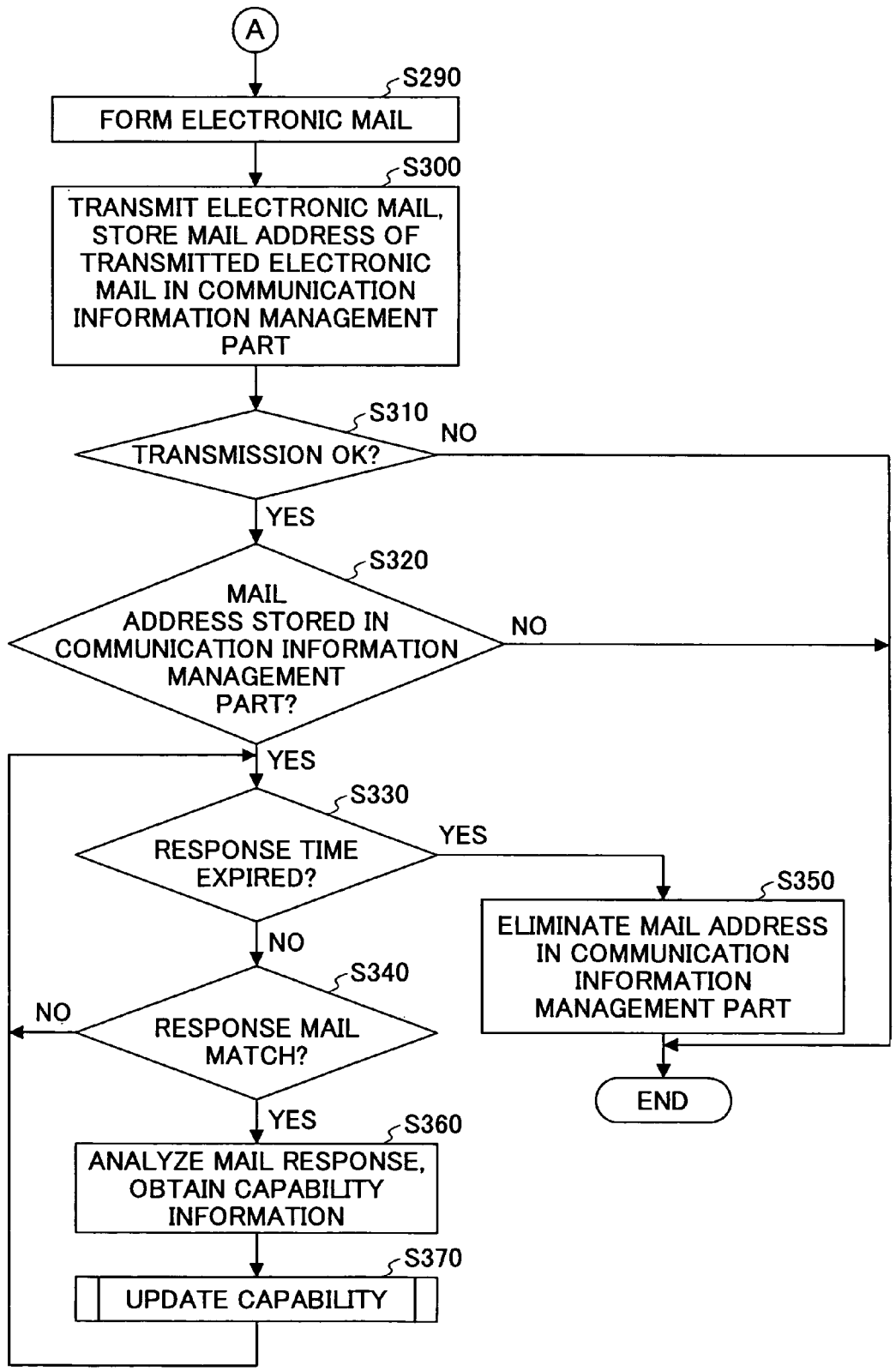
FIG. 7 is a flowchart showing a process (part 2) of performing broadcast transmission using electronic mail.

Next, a process of the sender communication terminal 80 broadcasting electronic mail via the Internet is described with the flowcharts shown in FIGS. 6 and 7.

First, a document is placed on the scanner part 85 (YES in Step S200), and remains until all of the receiver mail addresses for broadcast transmission are set (Step S210).

After the receiver mail addresses are set, a search for a corresponding entry is performed by searching through the mail address item 100an in the electronic directory 100 using the set mail address as a key (Step S220).

When the function mode of the corresponding entry stored in the function mode item 100bn is the simple mode (YES in Step S230), the mail address of the corresponding entry is added to a broadcast transmission list (Step S240), and the process advances to Step S260.

On the other hand, when the function mode of the corresponding entry stored in the function mode item 100bn is the full mode (NO in Step S230), the mail address and the capability information stored in the capability information item 100cn are added to a full mode transmission list (Step S250), and the process advances to Step S260.

Next, it is determined whether all of the mail addresses set by the operator have been subjected to processes of Step S220 through Step S240 or Step S250 (Step S260). When there are still unprocessed mail addresses remaining (NO in Step S260), the process returns to Step S220.

When all of the mail addresses set by the operator are subjected to processes of Step S220 through Step S240 or Step S250 (YES in Step S260), the sender communication terminal 80 remains in a stand-by state until transmission is directed by depression of a start key in the control display part 87 (Step S270).

When transmission is directed (YES in Step 270), the scanner part 85 reads out an image of a document, and the image storage part 89 stores the image information of the read out document (Step S280).

Then, electronic mail addressed to the mail addresses in the broadcast transmission list is formed with the image information stored in the image storage part 89 attached thereto (S290).

On the other hand, electronic mail addressed to the mail addresses in the full mode transmission list is also formed with the image information stored in the image storage part 89 attached thereto (S290). In this case, however, the attached image information is individually processed according to the capability information (e.g. resolution, image size, compression) of the receiver communication terminal of each mail address.

Then, the electronic mail messages formed in Step S290 are transmitted to the mail servers 40. The mail addresses transmitted in full mode are stored in the communication information management part 93 (Step S300).

After transmission of the electronic mail, it is determined whether the electronic mail has been properly transmitted by checking the mail servers 40 of the sender communication terminals (Step S310). When it is determined that the electronic mail has not been transmitted properly (NO in Step S310), the transmission is determined as an error, and the process is finished.

When it is determined that the electronic mail has been transmitted properly (YES in Step S310), the process is finished if there are no mail addresses stored in the communication information management part 93 (no electronic mail transmitted in full mode) (NO in Step S320).

In a case where electronic mail is transmitted in full mode (YES in Step S320), the sender communication terminal awaits a response mail confirming receipt from the receiver communication terminal for a prescribed period (Step S330, S340).

When there is no response mail within the prescribed period (YES in Step S330), the mail address stored in the communication information management part 93 is eliminated (Step S350), and the process is finished.

When there is a response mail within the prescribed period (NO in Step S330), the process proceeds to Step S340. When the mail address of the sender of the response mail matches with the mail address stored in the communication information management part 93 (YES in Step S340), the matching mail address in the communication information management part 93 is eliminated, and the process proceeds to Step S360. On the other hand, when the mail address of the sender of the response mail does not match with the mail address in the stored in the communication information management part 93 (NO in Step S340), the response mail is discarded, and the process returns to Step S330.

In Step S360, the matching response mail is analyzed, and the mail address and the capability information of the recipient are obtained. As shown in FIG. 8, the response mail has a header part, a main text part, and a capability information part (e.g. resolution, image size, compression).

Then, the electronic directory 100 is updated according to the obtained mail address and the capability information (Step S370). After the update, the process returns to Step S330 for receiving further response mail.

Figure 9:
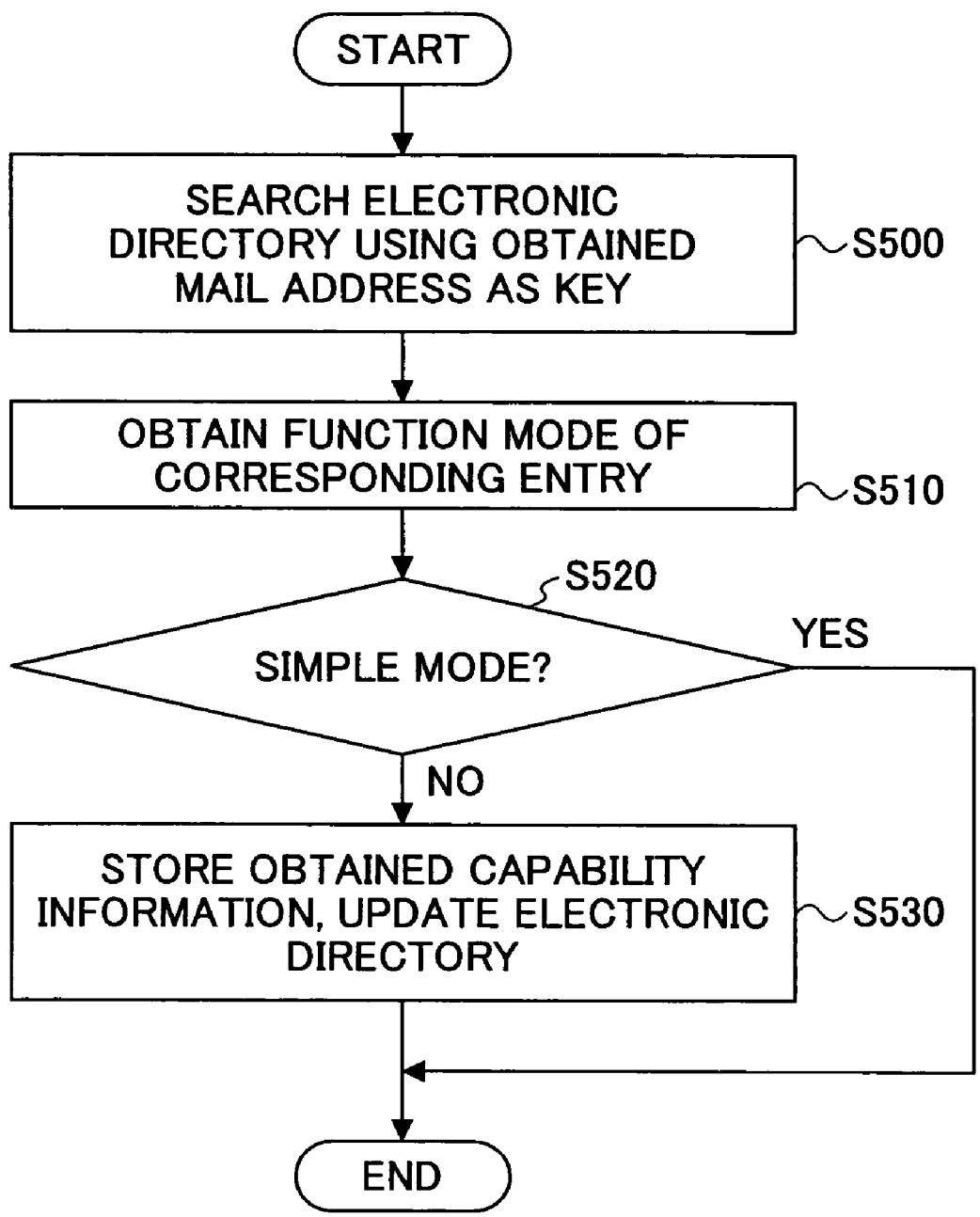
FIG. 9 is a flowchart showing a process for updating an electronic directory according to an embodiment of the present invention.

Next, a process of updating the electronic directory 100 according to the capability information obtained from the response mail (see Step S370 of FIG. 7) is described with reference to the flowchart in FIG. 9.

First, the mail address of the receiver communication terminal is obtained from a part of the header part of the response mail indicating the sender of the response mail (In this example, the part of "From:"), and the mail address item 100an in the electronic directory 100 is searched for a corresponding entry by using the extracted mail address as a key (Step S500).

Then, a function mode of the corresponding entry is obtained from the function mode 100bn (Step S510).

Then, when the obtained function mode is a Simple Mode (YES in Step S520), the process is finished.

Meanwhile, when the obtained function mode is a Full Mode (No in Step S520), the capability information (e.g. resolution, image size, compression) in the response mail is stored in the capability information item 100cn of the corresponding entry, so that the electronic directory 100 is updated (Step S530). After the update, the process is finished. Returning to FIG. 6, when the function mode of the corresponding entry stored in the function mode item 100bn is the simple mode (YES in Step S230), the mail address of the corresponding entry is added to a broadcast transmission list (Step S240), and the process advances to Step S260.

On the other hand, when the function mode of the corresponding entry stored in the function mode item 100bn is the full mode (NO in Step S230), the mail address and the capability information stored in the capability information item 100cn are added to a full mode transmission list (Step S250), and the process advances to Step S260.

Accordingly, in a case where an operator wishes a sender communication terminal to perform broadcast transmission to receiver communication terminals which function in simple mode and to receiver communication terminals which function in full mode, a single transmission instruction enables the sender communication terminal to perform the broadcast transmission with respect to receiver communication terminals designating simple mode transmission and also to receiver communication terminals designating full mode transmission.

The functions of the above-described facsimile communication system and the communication terminal according to an embodiment of the present invention can also be provided in the form of a program, which program can be recorded in a recording medium, such as a CD-ROM, installed in a communication terminal, and executed by the CPU of the communication terminal.

The program for performing the above-described functions and the recording medium having the program therein are also included in the present invention.

It is to be noted that the recording medium on which the program is recorded may be, for example, a semi-conductor medium (e.g. ROM, non-volatile memory), an optical medium (e.g. DVD, MO, MD, CD), and/or a magnetic medium (e.g. magnetic tape, flexible disk).

Furthermore, the program according to an embodiment of the present invention may not only be provided in the form of a program performing the above-described functions, but also be a program instructing, for example, an operating system, and/or another application program to perform the above-described functions.

Further, the present invention is not limited to these embodiments, but various variations and modifications may be made without departing from the scope of the present invention.

The present application is based on Japanese Priority Application No.2003-189985 filed on Jul. 2, 2003, with the Japanese Patent Office, the entire contents of which are hereby incorporated by reference.

What is claimed is:

1. A communication terminal for providing broadcast communication using electronic mail via a network, the communication terminal comprising:
    a facsimile function complying with ITU-T Recommendation T.37 for full mode;
    a storing unit configured to store an entry including a mail address and a function mode corresponding to the mail address in an electronic directory, the function mode being one of the full mode and simple mode;
    a determining unit configured to determine, based on the entry in the electronic directory, a function mode of a receiver communication terminal; and
    a transmitting unit configured to transmit image information in a form of broadcast mail to the receiver communication terminal when the determined function of the receiver communication terminal is the simple mode, and to transmit image information in a form of individual mail to the receiver communication terminal when the determined function mode is the full mode;
    a receiving unit configured to receive a receipt confirmation mail from the receiver communication terminal, and configured to obtain capability information and mail address of the receiver communication terminal;
    a searching unit configured to search the entry in the electronic directory, by utilizing the mail address of the receiver communication terminal;
    a checking unit configured to check whether the capability information of the receiver communication terminal is the full mode or the simple mode; and
    an updating unit configured to update the electronic directory when the function mode of the receiver communication terminal is set as the full mode, and when the function mode of the receiver communication terminal is set as the simple mode, not update the electronic directory,
    wherein when the communication terminal receives a receipt confirmation mail from the receiver communication terminal, the communication terminal obtains capability information of the receiver communication terminal, analyzes the receipt confirmation mail, and updates the electronic directory, and
    wherein the communication terminal updates the electronic directory when the function mode of the receiver communication terminal is set as the full mode, and does not update the electronic directory when the function mode of the receiver communication terminal is set as the simple mode.

2. The communication terminal as claimed in claim 1, wherein the entry is input from a control panel of the communication terminal.

3. The communication terminal as claimed in claim 1, wherein the entry is input from a Web browser of a workstation via the network.

4. Communication terminal means for providing broadcast communication using electronic mail via a network, the communication terminal means comprising:

storing means for storing an entry including a mail address and a function mode corresponding to the mail address in an electronic directory, the function mode being one of the full mode and simple mode;

determining means for determining, based on the entry in the electronic directory, a function mode of a receiver communication terminal means;

transmitting means for transmitting image information in a form of broadcast mail to the receiver communication terminal means when the determined function mode of the receiver communication terminal means is the simple mode, and transmitting image information in a form of individual mail to the receiver communication terminal means when the determined function mode is the full mode;

receiving means for receiving a receipt confirmation mail from the receiver communication terminal means, and obtaining capability information and mail address of the receiver communication terminal means;

searching means for searching the entry in the electronic directory, by utilizing the mail address of the receiver communication terminal means;

checking means for checking whether the capability information of the receiver communication terminal means is the full mode or the simple mode; and updating means for updating the electronic directory when the function mode of the receiver communication terminal means is set as the full mode, and when the function mode of the receiver communication terminal means is set as the simple mode, not updating the electronic directory, wherein the communication terminal means is a communication terminal means having a facsimile function complying with ITU-T Recommendation T.37 for full mode, wherein the first mode is a simple mode, wherein the second mode is the full mode, wherein when the communication terminal means receives a receipt confirmation mail from the receiver communication terminal means, the communication terminal means obtains capability information of the receiver communication terminal means, analyzes the receipt confirmation mail, and updates the electronic directory, and wherein the communication terminal means updates the electronic directory when the function mode of the receiver communication terminal is set as the second mode, and does not update the electronic directory when the function mode of the receiver communication terminal means is set as the first mode.

5. The communication terminal means as claimed in claim 4, wherein the entry is input from a control panel of the communication terminal means.

6. The communication terminal means as claimed in claim 4, wherein the entry is input from a Web browser of a workstation via the network.

7. A communication method for providing broadcast communication with a communication terminal using electronic mail via a network, the method comprising the steps of:

providing with the communication terminal a facsimile function complying with ITU-T Recommendation T.37 for full mode;

storing an entry including a mail address and a function mode corresponding to the mail address in an electronic directory of the communication terminal, the function mode being one of the full mode and simple mode;

determining, based on the entry in the electronic directory, a function mode of a receiver communication terminal;

transmitting image information in a form of broadcast mail to the receiver communication terminal when the determined function mode of the receiver communication terminal is a simple mode, and transmitting image information in a form of individual mail to the receiver communication terminal when the determined function mode is a full mode;

receiving a receipt confirmation mail from the receiver communication terminal, and obtaining capability information and mail address of the receiver communication terminal;

searching the entry in the electronic directory, by utilizing the mail address of the receiver communication terminal;

checking whether the capability information of the receiver communication terminal is the full mode or the simple mode; and updating the electronic directory when the function mode of the receiver communication terminal is set as the full mode, and when the function mode of the receiver communication terminal is set as the simple mode, not updating the electronic directory.

8. The communication method as claimed in claim 7, wherein the entry is input from a control panel of the communication terminal.

9. The communication method as claimed in claim 7, wherein the entry is input from a Web browser of a workstation via the network.

10. A computer readable medium tangibly embodying a program of instructions executable by a computer to perform broadcast communication with a communication terminal using electronic mail via a network, the program comprising:

a facsimile function complying with ITU-T Recommendation T.37 for full mode;

a storing function for storing an entry including a mail address and a function mode corresponding to the mail address in an electronic directory, the function mode being one of the full mode and simple mode;

a determining function for determining, based on the entry in the electronic directory, a function mode of a receiver communication terminal; and a transmitting function for transmitting image information in a form of broadcast mail to the receiver communication terminal when the determined function mode of the receiver communication terminal is the simple mode, and transmitting image information in a form of individual mail to the receiver communication terminal when the determined function mode is the full mode;

a receiving function for receiving a receipt confirmation mail from the receiver communication terminal, and obtaining capability information and mail address of the receiver communication terminal;

a searching function for searching the entry in the electronic directory, by utilizing the mail address of the receiver communication terminal;

a checking unit for checking whether the capability information of the receiver communication terminal is the full mode or the simple mode; and an updating unit for updating the electronic directory when the function mode of the receiver communication terminal is set as the full mode, and when the function mode of the receiver communication terminal is set as the simple mode, not updating the electronic directory.

11. The computer readable medium as claimed in claim 10, wherein the entry is input from a control panel of the communication terminal.

12. The computer readable medium as claimed in claim 10, wherein the entry is input from a Web browser of a workstation via the network.

13. The communication terminal as claimed in claim 1, wherein said broadcast mail including said image information transmitted by said transmitting unit is addressed to a plurality of communication terminals.

14. The communication terminal as claimed in claim 1,
wherein said electronic directory stores for each mail address, in addition, capability information associated with the mail address, and
wherein in said full mode, said image information is individually processed for a plurality of communication terminals having associated entries in said electronic directory, in accordance with capability information in said associated entries, and transmitted to said plurality of communication terminals.

15. The communication terminal as claimed in claim 1, wherein when the communication terminal having both the full mode and the simple mode as available function modes is set to the simple mode, the communication terminal does not update the electronic directory when the receipt confirmation mail is received from the receiver terminal.

16. The communication terminal as claimed in claim 1, wherein when the communication terminal having both the full mode and the simple mode as available function modes is set to the simple mode, the communication terminal does not update function mode information of the electronic directory for the receiver terminal, when the receipt confirmation mail is received from the receiver terminal.

17. The communication terminal as claimed in claim 1, wherein when the communication terminal having both the full mode and the simple mode as available function modes is set to the simple mode, the communication terminal does not update the mail address information in the electronic directory for the receiver terminal, when the receipt confirmation mail is received from the receiver terminal.

* * * * *